United States Patent
Panuganty

(10) Patent No.: US 11,042,591 B2
(45) Date of Patent: Jun. 22, 2021

(54) ANALYTICAL SEARCH ENGINE

(71) Applicant: Splunk inc., San Francisco, CA (US)

(72) Inventor: Ramesh Panuganty, Cupertino, CA (US)

(73) Assignee: SPLUNK INC., San Francisco, CA (US)

( * ) Notice: Subject to any disclaimer, the term of this patent is extended or adjusted under 35 U.S.C. 154(b) by 294 days.

(21) Appl. No.: 15/382,372

(22) Filed: Dec. 16, 2016

(65) Prior Publication Data

US 2017/0097940 A1 Apr. 6, 2017

Related U.S. Application Data

(63) Continuation-in-part of application No. 15/188,769, filed on Jun. 21, 2016.

(60) Provisional application No. 62/183,194, filed on Jun. 23, 2015.

(51) Int. Cl.
*G06F 16/00* (2019.01)
*G06F 16/9032* (2019.01)
*G06F 16/951* (2019.01)

(52) U.S. Cl.
CPC ...... *G06F 16/90324* (2019.01); *G06F 16/951* (2019.01)

(58) Field of Classification Search
CPC combination set(s) only.
See application file for complete search history.

(56) References Cited

U.S. PATENT DOCUMENTS

| | | |
|---|---|---|
| 6,292,796 B1 | 9/2001 | Drucker et al. |
| 6,766,320 B1 | 7/2004 | Wang et al. |
| 7,181,438 B1 | 2/2007 | Szabo |
| 7,305,380 B1 | 12/2007 | Hoelzle et al. |
| 7,403,938 B2 | 7/2008 | Harrison et al. |
| 7,519,585 B2 | 4/2009 | Kenney et al. |
| 8,027,964 B2 | 9/2011 | Boulis |
| 8,204,897 B1 | 6/2012 | Djabarov et al. |
| 8,239,364 B2 | 8/2012 | Wable et al. |
| 8,370,352 B2 | 2/2013 | Lita et al. |
| 8,572,076 B2 | 10/2013 | Xiao et al. |
| 8,775,517 B1 | 7/2014 | Goldman et al. |
| 8,972,332 B2 | 3/2015 | Ruhl et al. |
| 9,110,992 B2 | 8/2015 | Johnson et al. |

(Continued)

OTHER PUBLICATIONS

Preinterview first Office Action received for U.S. Appl. No. 15/188,769 dated Dec. 12, 2019, 16 pages.

(Continued)

*Primary Examiner* — Shyue Jiunn Hwa
(74) *Attorney, Agent, or Firm* — Artegis Law Group, LLP

(57) ABSTRACT

In one or more embodiments, an analytical search engine is provided. The analytical search engine provides a search-driven data analysis approach that greatly facilitates data searches. The analytical search engine provides a more efficient user experience and, at the same time, simplifies the search process for its users. The analytical search engine employs a robust search model that provides a comprehensive definition and coverage of available data. The search engine provides various functionality such as type-ahead or look-ahead suggestions to help users define precise queries. The search engine also identifies ambiguous or incomplete queries and provides disambiguation suggestions to correct the queries.

27 Claims, 9 Drawing Sheets

(56) References Cited

U.S. PATENT DOCUMENTS

| | | | |
|---|---|---|---|
| 9,336,269 B1 | 5/2016 | Smith et al. | |
| 9,881,102 B2 | 1/2018 | Gordner et al. | |
| 10,339,144 B1 | 7/2019 | Upstill et al. | |
| 10,339,186 B2 | 7/2019 | Chakra et al. | |
| 10,346,414 B2 | 7/2019 | Ye | |
| 10,459,926 B2 | 10/2019 | Curtiss et al. | |
| 10,474,685 B1 | 11/2019 | Gomes et al. | |
| 10,592,093 B2 | 3/2020 | Sainani et al. | |
| 2005/0039589 A1 | 2/2005 | Mori et al. | |
| 2007/0156696 A1 | 7/2007 | Lim | |
| 2008/0059474 A1 | 3/2008 | Lim | |
| 2008/0215552 A1* | 9/2008 | Safoutin | G06F 3/04847 |
| 2008/0249786 A1 | 10/2008 | Oldham et al. | |
| 2008/0256069 A1 | 10/2008 | Eder | |
| 2009/0216563 A1* | 8/2009 | Sandoval | G06Q 50/24 |
| | | | 705/3 |
| 2009/0240683 A1 | 9/2009 | Lazier et al. | |
| 2009/0276419 A1* | 11/2009 | Jones | G06F 16/3322 |
| 2009/0313237 A1 | 12/2009 | Agrawal et al. | |
| 2010/0005087 A1 | 1/2010 | Basco et al. | |
| 2011/0119100 A1 | 5/2011 | Ruhl et al. | |
| 2012/0102002 A1 | 4/2012 | Sathyanarayana et al. | |
| 2012/0221555 A1 | 8/2012 | Byrne et al. | |
| 2012/0265744 A1* | 10/2012 | Berkowitz | G06Q 30/0613 |
| | | | 707/705 |
| 2013/0232167 A1 | 9/2013 | Vidra | |
| 2014/0025703 A1 | 1/2014 | Samuels et al. | |
| 2014/0040301 A1 | 2/2014 | Chadha et al. | |
| 2014/0188862 A1* | 7/2014 | Campbell | G06Q 50/01 |
| | | | 707/728 |
| 2014/0282136 A1* | 9/2014 | Marantz | G06F 16/17 |
| | | | 715/764 |
| 2015/0095132 A1 | 4/2015 | Van et al. | |
| 2015/0220836 A1 | 8/2015 | Wilson et al. | |
| 2015/0286708 A1 | 10/2015 | Tao | |
| 2015/0317316 A1 | 11/2015 | Ghanekar et al. | |
| 2016/0026629 A1 | 1/2016 | Clifford et al. | |
| 2016/0188702 A1* | 6/2016 | Lee-Goldman | G06F 16/3322 |
| | | | 707/749 |
| 2016/0203138 A1 | 7/2016 | Feldschuh | |
| 2016/0378867 A1 | 12/2016 | Panuganty | |
| 2017/0010931 A1 | 1/2017 | Agarwal et al. | |
| 2017/0070521 A1 | 3/2017 | Bailey et al. | |
| 2017/0098002 A1 | 4/2017 | Byrnes et al. | |
| 2018/0150486 A1 | 5/2018 | Hawkes et al. | |
| 2019/0050406 A1 | 2/2019 | Nguyen et al. | |

OTHER PUBLICATIONS

Final Office Action received for U.S. Appl. No. 15/188,769 dated Mar. 13, 2020, 22 pages.

Non-Final Office Action received for U.S. Appl. No. 15/663,596 dated Mar. 26, 2020, 34 pages.

Non-Final Office Action received for U.S. Appl. No. 15/663,596, dated Mar. 26, 2020, 20 pages.

Final Office Action received for U.S. Appl. No. 15/663,596, dated Oct. 5, 2020, 31 pages.

Non-Final Office Action received for U.S. Appl. No. 15/663,554, dated Apr. 17, 2020.

Notice of Allowance received for U.S. Appl. No. 15/663,554, dated Aug. 26, 2020.

Notice of Allowance received for U.S. Appl. No. 15/188,769, dated Jul. 29, 2020.

Notice of Allowance issued in U.S. Appl. No. 15/663,596 dated May 4, 2021.

* cited by examiner

ANALYTICAL SEARCH ENGINE

RELATED APPLICATION

This application is a continuation-in-part of and claims priority to U.S. patent application Ser. No. 15/188,769, filed on Jun. 21, 2016, which, in turn, claims priority to U.S. Provisional Patent Application No. 62/183,194, filed on Jun. 23, 2015, the disclosures of which are incorporated by reference herein.

BACKGROUND

Various users, such as commercial business users, use several disparate data sources to maintain and process data. One type of data source is a relational data source. Relational data sources are organized and accessed according to the relationships between data items. Relationships between data items are generally expressed as tables having rows and columns, which may be interconnected. Other forms of data sources, unlike the relational data sources, can include Excel documents, XML files, JSON format, word documents, and other text content as well.

SaaS applications like Salesforce, NetSuite, ServiceNow also offer structured data to the users for access using web services, APIs, REST interfaces and other programmable interfaces.

Data sources like Hadoop also offer structured as well as unstructured data and offer query interfaces that are both non-SQL and SQL based apart from other interfaces.

The query language (like "SQL", or "PostGre", or other programmable interfaces like APIs) is used to create, modify, and retrieve data from relational database management systems. Using a query language, a skilled user can retrieve data from a database and perform other, more complex functions. Although SQL or PostGre are standard query languages, many database products support these query languages with proprietary extensions to the language format.

The query language commands can be used to interactively work with a database or can be utilized programmatically to interface with a database. The non-relational documents are mostly searched as text content. Query language APIs have been very complicated and difficult to use. Moreover, these APIs have not provided functionality for easily allowing a keyword-based search to be performed on a database, such as those that are so common today in application programs and on Web pages. The complexity and limitations of previous query language APIs can be extremely frustrating for a developer trying to create a Web page or application program that executes even a simple keyword-based search query against a backend relational database.

The data fetched from multiple data sources is also difficult to integrate. Aggregating data from these sources in order to provide meaningful insights is always a cumbersome and time-consuming process. Cross referencing objects across multiple data sources, is typically not possible during the query itself and happens as a manual effort.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Improved crawling and curation of data and metadata from diverse data sources is described. In some embodiments, improvements are achieved by interpreting the context, vocabulary and relationships of data element, to enable relational data search capability for users. The user querying process is improved by systematic identification of the data objects, context, and relationships across data objects and elements, aggregation methods and operators on the data objects and data elements as identified in the curation process. User query suggestions and recommendations can be adjusted based on the context, relationships between the data elements, user profile, and the data sources. When the user query is executed, the query text is translated into an equivalent of one or more query statements, such as SQL or PostGre statements, and the query is performed on the identified data sources. Results are assembled to present the answer in a meaningful visualization for the user query.

In one or more embodiments, an analytical search engine is provided. The analytical search engine provides a search-driven data analysis approach that greatly facilitates data searches. The analytical search engine provides a more efficient user experience and, at the same time, simplifies the search process for its users. The analytical search engine employs a robust search model that provides a comprehensive definition and coverage of available data. The search engine provides various functionality such as type-ahead or look-ahead suggestions to help users define precise queries. The search engine also identifies ambiguous or incomplete queries and provides disambiguation suggestions to correct the queries.

Search engine also handles queries that have multiple meanings and mitigates cases where there could be more than one possible answer to the same user query or question. The user query or question may be input in any suitable way such as, by way of example and not limitation, through a keyboard, by touch input, verbal input, and so on. In at least some embodiments, the search engine also implements data governance policies to secure a user's access to data based on various parameters.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Improved crawling and curation of data and metadata from diverse data sources is described. In some embodiments, improvements are achieved by interpreting the context, vocabulary and relationships of data elements, to enable relational data search capability for users. The user querying process is improved by systematic identification of the data objects, context, and relationships across data objects and elements, aggregation methods and operators on the data objects and data elements as identified in the curation process. User query suggestions and recommendations can be adjusted based on the context, relationships between the data elements, user profile, and the data sources. When the user query is executed, the query text is translated into an equivalent of one or more query statements, such as SQL or PostGre statements, and the query is performed on the identified data sources. Results are assembled to present the answer in a meaningful visualization for the user query.

Thus, various embodiments are directed to determining the real world context of data in order to identify how users would query the data. Techniques identify how one data element relates to another data element in a different data source and identify the aggregation methods and operator methods on these data elements. The data sources associated with each of the data elements are mapped together, and the data elements are also mapped together to logically and dynamically construct the user query text, and pre-populate what the user might be searching for, as optimized for a given user context.

Example Environment

Figure 1:
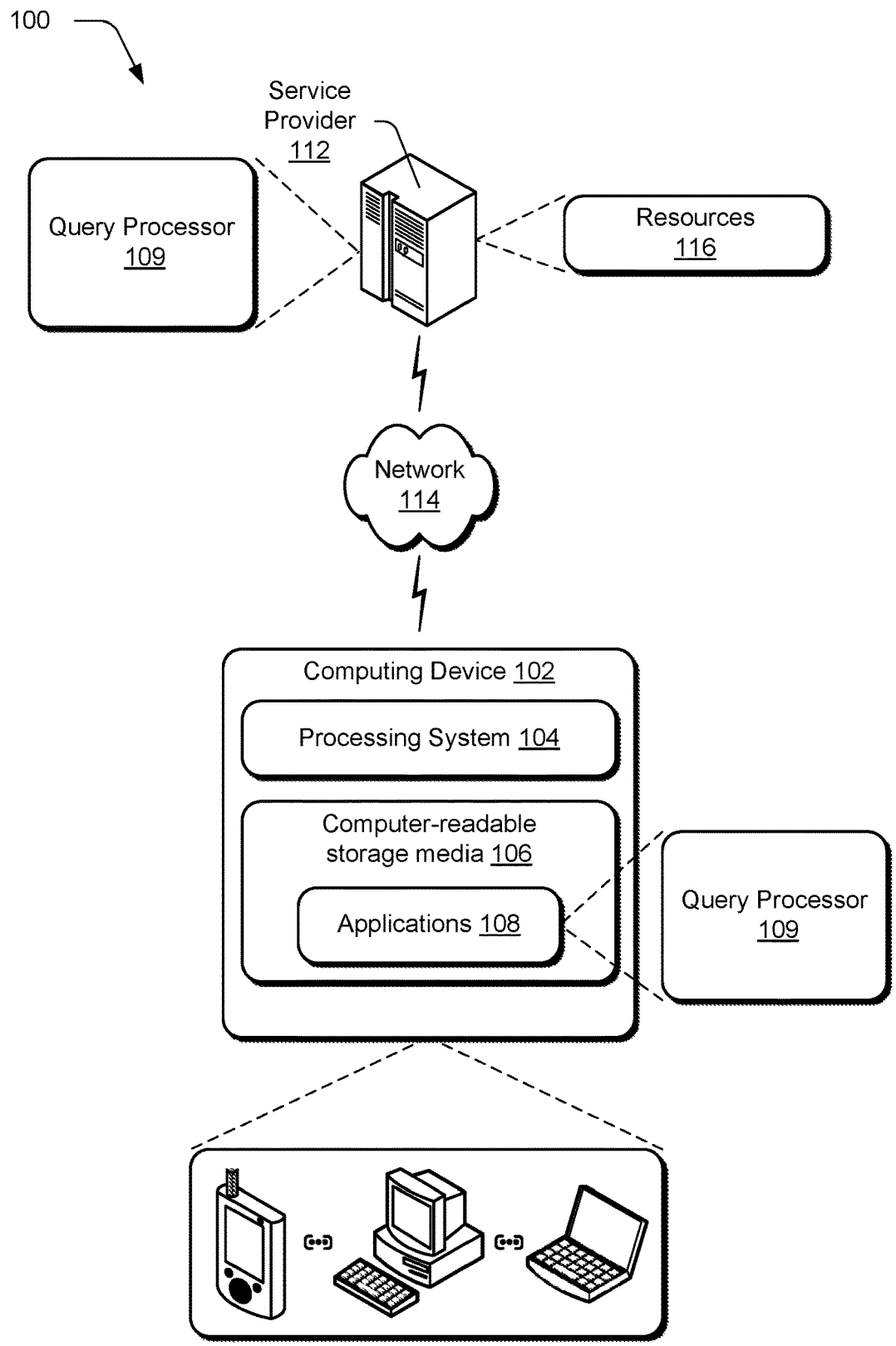
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102 including a processing system 104 that includes one or more processing devices, one or more computer-readable storage media 106, and various applications 108 embodied on the computer-readable storage media 106 and operable via the processing system 104 to implement corresponding functionality described herein. In at least some implementations, applications 108 include or otherwise make use of a query processor 109. In some implementations, the query processor 109 is a standalone application that allows users to enter queries and have results returned from a wide variety of data sources. In other implementations, the query processor 109 is included as part of another application or system software such as a computing device's operating system. As will become apparent, aspects of the query processor 109 can be distributed across multiple computing devices. For example, aspects of the query processor 109 can be implemented by a service provider 112 and other aspects of the query processor 109 can be implemented by computing device 102.

The query processor 109, whether implemented on one computing device or multiple computing devices in a distributed fashion, is designed to provide improved crawling and curation of data and metadata from diverse data sources. In some embodiments, improvements are achieved by interpreting the context, vocabulary and relationships of data elements, to enable relational data search capability for users. The user querying process is improved by systematic identification of the aggregation methods and operators on the data elements as identified in the curation process. User query suggestions and recommendations can be adjusted based on the context, relationships between the data elements, user profile, and the data sources. When the user query is executed, the query text is translated into an equivalent of one or more search statements, such as SQL or PostGre statements, and the search is performed on the identified data sources. Results are assembled to present the meaningful visualization for the user query.

Applications 108 may also include a web browser which is operable to access various kinds of web-based resources (e.g., content and services). The web browser may include query processing functionality, such as that described in connection with the query processor 109, as a native part of the web browser or, alternately, as a plug-in to the web browser.

In at least some implementations, the applications 108 represent a client-side component having integrated functionality operable to access web-based resources (e.g., a network-enabled application), browse the Internet, conduct searches, interact with online providers, and so forth. Applications 108 further include an operating system for the computing device 102 and other device applications.

The computing device 102 may be configured as any suitable type of computing device. For example, the computing device may be configured as a desktop computer, a laptop computer, a mobile device (e.g., assuming a handheld configuration such as a tablet or mobile phone), a tablet, a camera, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 6.

The environment 100 further depicts one or more service providers 112, configured to communicate with computing device 102 over a network 114, such as the Internet, to provide a "cloud-based" computing environment. Generally speaking, a service provider 112 is configured to make various resources 116 available over the network 114 to clients. The service providers 112 can provide query processing services, such as those provided by query processor 109, described above and below.

In some scenarios, users may sign up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a notification service (such as one that sends various types of notifications to applications 108 and query processor 109), a content publisher service that distributes content, such as streaming videos and the like, to various computing devices, a web development and management service, a collaboration service, a social networking service, a messaging service, and so forth. Content may include various combinations of assets, video comprising part of an asset, advertisements, audio, query results, multi-media streams, animations, images, web documents, web pages, applications, device applications, and the like.

Various types of input devices and input instrumentalities can be used to provide input to computing device 102. For example, the computing device can recognize input as being a mouse input, stylus input, touch input, input provided through a natural user interface, and the like. Thus, the computing device can recognize multiple types of gestures including touch gestures and gestures provided through a natural user interface.

Having considered an example environment, consider now a discussion of some example details of a query processor 109 in accordance with one or more implementations.

Example Query Processor

Figure 2:
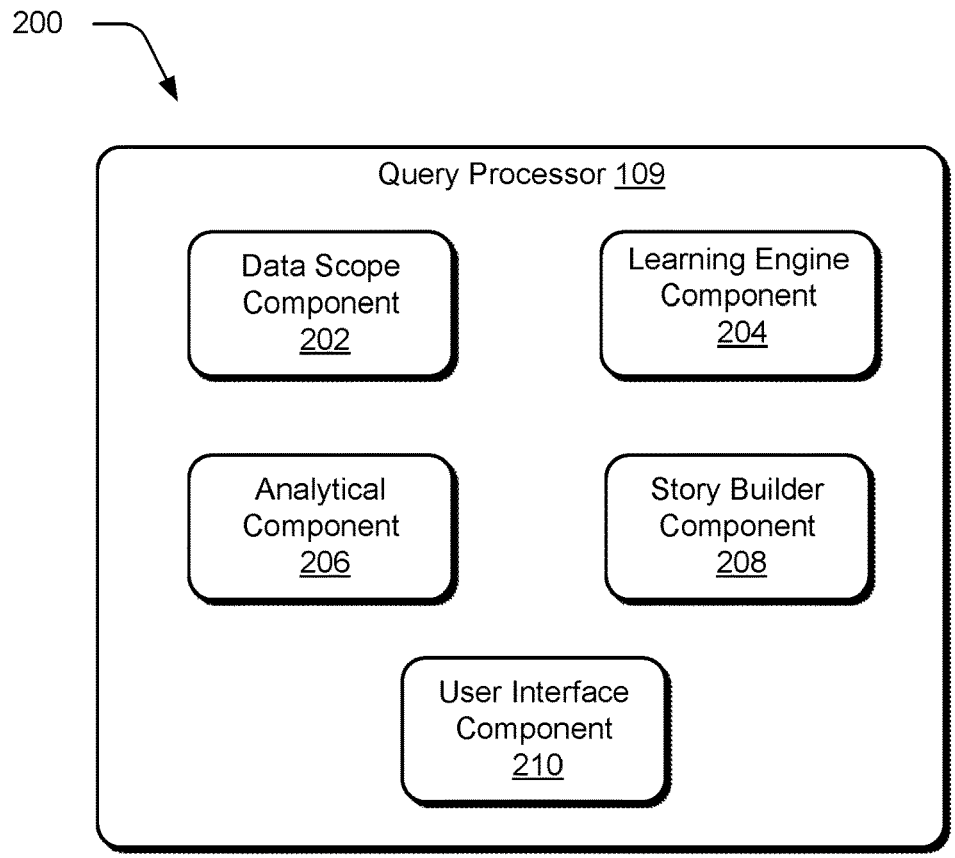
FIG. 2 is an illustration of an example query processor in accordance with one or more embodiments.
Figure 2:
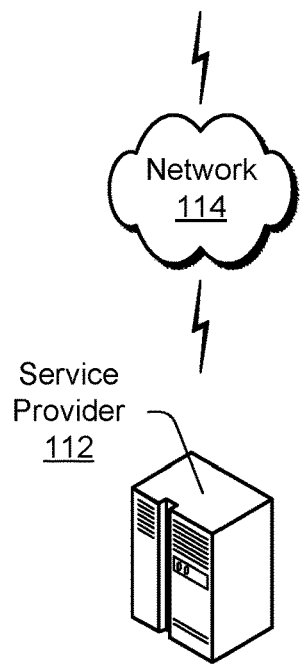

FIG. 2 illustrates an environment 200 that includes an example query processor 109. In this implementation, the query processor 109 includes, among other components, a data scope component 202, a learning engine component 204, an analytical component 206, a story builder component 208, and a user interface component 210. It is to be appreciated and understood, however, that aspects of the functionality of the query processor 109 can be implemented by a remote entity, such as one or more servers in a cloud-based environment. When implemented using a remote entity, in some implementations, one or more components of the query processor 109 can be present on the remote entity or can be present at both the computing device 102 and the remote entity. In addition, the components present at the computing device 102 can perform syncing operations with the components present at the remote entity.

The data scope component 202, learning engine component 204, analytical component 206, story builder component 208, and user interface component 210 work together to allow a user to enter a query into search software, such as the query processor, have searches performed on multiple data sources, and have meaningful search results returned to the user.

Data scope component 202 is representative of functionality that processes metadata associated with a particular data source and organizes the metadata in a manner that expedites the crawling process during execution of the user search. The data can be sourced from a variety of data sources and each data source can have its metadata natively organized differently. The data scope component seeks to process the metadata and contextually structure the metadata in a manner that facilitates its use in the search functionality described herein. Data sources can include, by way of example and not limitation, internal data sources (e.g., internal to a particular computing device or internal network on which searching takes place), external data sources, public data sources and the like. These and other data sources can be relational data sources, non-relational data sources, cloud-based data sources, open data sources, and the like. Individual data sources can be analyzed based on the data source's name, format, and other related information to provide a context for the information contained in the data source. For example, a data source by the name "RetailFacts" will be first broken into two words—"Retail" and "Facts", by parsing of dictionary words from both left-to-right and right-to-left. "Retail" is then understood as a domain. The known list of vocabulary words will include words like stores, sales, salesrep, salesperson, sku and other items. Another example name of a data source is "OncologyPatients", which would be understood as "Oncology" and "Patients" and tied to life sciences terminology.

The name of variables can also matter and be taken into consideration. For example, if a table name is "Student_Fact" and if the system sees an attribute or a database column as "Age"—the system would assign a probability that the attribute represents student's age.

In one or more embodiments, the data in a particular data source can be grouped into logical sets of related entities. These entities may be related in a structural way. For example, the logical sets of related entities may reside in the form of tables having columns and rows. As an example, consider the following.

Assume that the data source of interest includes data that pertains to the Summer Olympics medal tally. This data can be compiled into a spreadsheet file and uploaded for processing by the data scope component 202. The sets or columns can be analyzed and assigned an attribute that defines the data's characteristics. So, for example, the medal tally data may consist of details about the athletes and the sports they play, their country of origin, the year in which they won the medal, the type of medal won, and the like. Each data column is associated with an attribute such as a person's name, country names, sports names, year, and number of medals. Once these attributes are defined and assigned to the data from the data source, the attributes are further analyzed in relation to the attributes of other entities or columns present in the data to identify logical relationships between them. Any suitable type of analysis can take place including formula-based analysis, mathematical deviation analysis, and the like. For example, the total number of medals won can be determined by the sum of columns containing the number of gold, silver, and bronze medals. In addition, the attributes of adjacent columns or groups of two or more columns can also be analyzed to enhance the meaning of the relationship between the columns. Adjacent columns would result in higher probability by the ranking algorithm. For example, if one column name is "ticket number" and the next column is "price", it would be ranked in the system as a likely "ticket price". The probability would keep increasing as the users start searching and accept the results. If other columns are titled as "from" and "to"—they would be understood as "travel origin" and "travel destination", and the domain would pick other words from travel industry.

Further, for example, if the attribute of one column is "person name" and the next column is a number between 1-100, the relationship between the columns may be determined as an age of the person, or the ID of the person. But if the adjacent column is "street", the prior column will also be marked as a likely "street number". This way, there are multiple probabilities for a single attribute during the scanning process and the probabilities will get automatically adjusted during the actual usage of the product, e.g., by being adjusted up or down based on the user's searches and acceptance of the results. Additional meaning is derived from the data that supports instant discovery by the data scope component.

In addition, the "randomness" of data can be analyzed to determine whether the data is a finite set or a non-finite set.

Randomness can be considered as anything that does not contain repetitive data. For example, the names of countries is a finite set because there are only a limited number of countries. Such data is identified for use in presenting relevant visualizations, and also to show type-ahead suggestions in the search drop down menu, or related searches for a given user query. Examples of non-finite sets include, by way of example and not limitation, units sold month on month which can be very different each month, or monthly revenues—which are not going to be exactly same every month. Consider the case of an Oncology scenario, where the list of symptoms are finite. If the user queries "yearly trend of cancer symptoms"—one of the visualizations will be pie-chart of patient count for each symptom for every year, and the other visualization could be a grouped-bar chart for each symptom by year. If the user queried the same thing on a random attribute, e.g., "yearly trend of cancer patient ages"—the visualization can be a line chart, or a scatter plot.

Learning engine component 204 is representative of functionality that processes the metadata processed by the data scope component 202 and enriches the metadata by building context and semantics to better interpret a user's query. In the illustrated and described embodiment, the data elements are mapped to each other to identify relationships and set a context. This helps to narrow down the search results to an accurate and limited set. For example, if an employee entity is linked to a location entity, the scope of a user query on employees could be limited the linking entity. The scope of any query can generally be limited by the finite attributes in the same entity or the linked entities.

As another example, if the user enters a query for a list of all employees in a company, the results can be limited to a particular company location or office, thus mapping the two data elements—employees and office location—and establishing their relationship for better presentation to the user. The query can be typed by the user using natural language. The natural language query is analyzed and sentence constructions are examined for ascertaining the context of the query, as described below in more detail. For example, by identifying the address as an entity where an employee works, the search query "employees in office-address", or "employees at office-address" can be interpreted. As another example, consider an example query of "number of automatic transmission cars". Here, the system could show a type-ahead suggestion of "by model", or limit the search to show the results for a given model.

In one or more embodiments, the query typed by the user is checked for usage of abbreviations or commonly used informal words and auto-corrections are performed. For example, if the user has typed "Rx", such is identified and replaced with the formal term "prescription" to search in the various data sources. Usually, such terms are identified by crawling multiple data sources, such as Wikipedia, and the ones appropriate for the data source are cached. In addition to displaying search results for the user's query, related searches that could be helpful for the user are also identified and presented. Related searches refer to the searches pertaining either to the same subject, or matches some of the criteria that the user is querying for.

So-called adjacencies can be pre-generated based on the metadata. For example, while searching for doctors prescribing a certain medicine in a city, the results can also show the number of such doctors in the city's state and the number of doctors who are individual practitioners. Such additional information on similarities and anomalies is also identified from publicly available information sources and presented as a special note with the search results. For example, when a user searches for the average store sales, the special note can display "23% higher than national retail store average". This way, by curating the metadata, the user's search experience can be enriched.

Analytical component 206 is representative of functionality that the compiles the query results for the user. The data scope component 202 aggregates and identifies correlated data that has a parent-child relationship. Parent child relationship can generally refer to one-to-many relationship. Examples include "Employer and employees", or "school and students", or "city and residents", to name just a few.

Along with search results, this related data is also presented to the user. For example, if the user searches for auto sales for a particular region, the sales figures for the adjacent regions or the state in which the region falls can also be shown. The context of the query is also identified. For example, if the user has typed "100M", and there are words such as "revenue" or "sales" in the query, the query is interpreted as "100 million" and results are shown accordingly.

In one or more embodiments, any anomalies in the data are also identified and highlighted for the user. Further actions or recommendations for the identified anomaly can be presented to the user. That is, for a given set of query and results, anomalies can be detected. For example, a territory manager of several tire service centers may search for "centers with over 6 hours of service times". The results can be shown along with related searches such as, by way of example not limitation, information pertaining to the service center with longest service times and shortest times, and their customer feedback ratings can be shown. Further, a recommendation can be provided with a link to set up a review meeting with a particular service center's manager, and a list to download details of all the work orders. This way, the user can take quick actions to address the anomalies. Users are also provided an ability to search or filter cloud services or associated data sources by referencing previously occurred anomalies. For example, a query of "new home loans across Canada last month" by the head of mortgage business at a bank, can show the asked results along with the results of "top 5 cities with most outstanding home loans last month", and "top 3 age groups of home loaners last month". Further, a user can search for "show 5 actions before and after the security anomalies in the last 30 days" or "show all anomalies for a particular user".

Story builder component 208 is representative of functionality that presents query results to user by way of user interface component 210. The story builder component performs a number of different functions. For example, the story builder component attempts to understand the user's behavior to predict what the user will type in a search box. By doing so, the story builder component can provide predictions that are selectable by the user with respect to the natural language query the user enters. Alternately or additionally, the story builder component can attempt to resolve any ambiguities in a user's search query. For example, the user may enter "what were the number of DUIs in Washington last month" in the search box provided by the user interface component. The story builder component can provide other possible search options, and a drop-down menu, such as "what where the number of DUIs in Washington state last month" and "what were the number of DUIs in Washington D.C. last month." This allows the user to disambiguate the otherwise ambiguous search query. In addition, the story builder component also provides a mechanism for presenting query results to the user. In some instances, the story builder component includes a large library of presentation structures, such as chart types and the like, that can be used for presenting query results to the user. The story builder component can, over time, learn a particular user's preference and use the user's preference in selecting presentation structures for the user's data. Presentation structures that are surfaced to the user can be selected by the story builder component based on the type of data being searched. That is, in some instances tabular type presentation structures may be more appropriate than bar graphs, pie charts, and the like.

User interface component 210 is representative of functionality that enables a user to interface with the query processor 109. The user interface component does so by providing a search box in which the user may enter a natural language search query, as well as other visualizations such as those mentioned above, to enhance the user's experience.

In this manner, the query processor 109 can provide for improved crawling and curation of data and metadata from diverse data sources. Improvements can be achieved by interpreting the context, vocabulary and relationships of data elements, to enable relational data search capability for users. The user querying process is improved by systematic identification of the aggregation methods and operators on the data elements as identified in the curation process. For example, if an attribute is identified as a MONEY type, a user's query such as "stores with sales over 2M" will be understood as "stores with sales over 2000000". Similarly, if an attribute is identified as "age" in a student entity, a query "teenager students" will be interpreted as "students with age between 13 to 19". User query suggestions and recommendations can be adjusted based on the context, relationships between the data elements, user profile, and the data sources. When the user query is executed, the query text is translated into an equivalent of one or more search statements, such as SQL statements or other statements, and the search is performed on the identified data sources. Results are assembled to present a meaningful answer to the user query.

The environment 200 also includes network 114 and service provider 112 described above in detail. As noted above, aspects of the query processor 109 can be implemented by one or more service providers.

Having considered an example query processor 109 and its components, consider now example methods in accordance with one or more embodiments.

Example Methods

Figure 3:
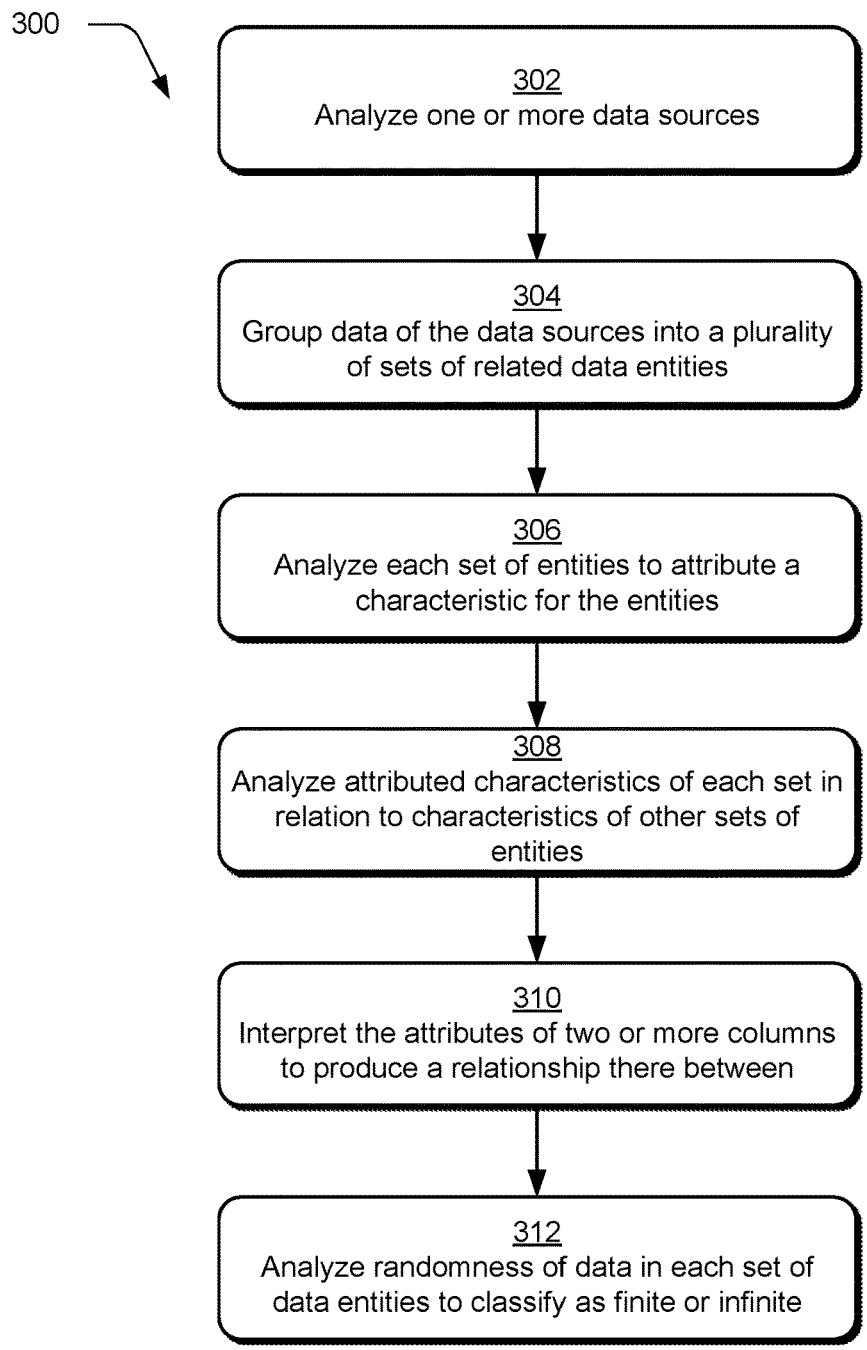
FIG. 3 is a flow diagram depicting an example procedure in accordance with one or more implementations.

FIG. 3 describes an example procedure 300 for processing metadata in a manner that expedites the crawling process. The method is designed to identify relationships and other attributes of metadata to facilitate search queries. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in an environment by a suitably configured device, such as the example computing device 102 of FIG. 1 that makes use of a query processor 109, such as that described above.

One or more data sources are analyzed, at block 302, in order to provide a context for the information contained in the data source. Any suitable type of data source can be analyzed including, by way of example and not limitation, relational data sources or data warehouses, external data sources, public data sources and the like. The data source can be analyzed based on its name, sub-names, format, frequency of use, and access restrictions. At block 304, the data of the data source or sources is grouped into sets of related data entities. Any suitable type of related data entities can be used. In at least some embodiments, the data entities comprise columns. At block 306, each set of data entities is analyzed to attribute a characteristic to the data entity. Characteristics can include any suitable type of characteristics such as, by way of example and not limitation, people names, country names, street addresses, stock symbols, years, and any other suitable type of descriptive characteristic which might be associated with the data of a particular entity. At block 308, the attributed characteristics of each set of entities is analyzed in relation to characteristics of other sets of entities. This enables logical relationships to be identified between sets of data entities. For example, a column's data could be determined by the sum of two or more other columns In the example given above, a column associated with the total medal tally is found to be the sum of the columns associated with gold, silver, and bronze medals.

At block 310, the attributes of two or more columns are interpreted to produce a relationship between the columns. For example, if one column is associated with a person's name, and the next column is age, the relationship between the columns is determined as the age of a person. At block 312, the randomness of data in each set of data entities, e.g., each column, is analyzed to classify the data as finite or infinite. If the data is determined to be a finite set, the data is cached and used for grouping features in visualizations. The above-described process enables a natural language search to be conducted using the sets of data entities.

Figure 4:
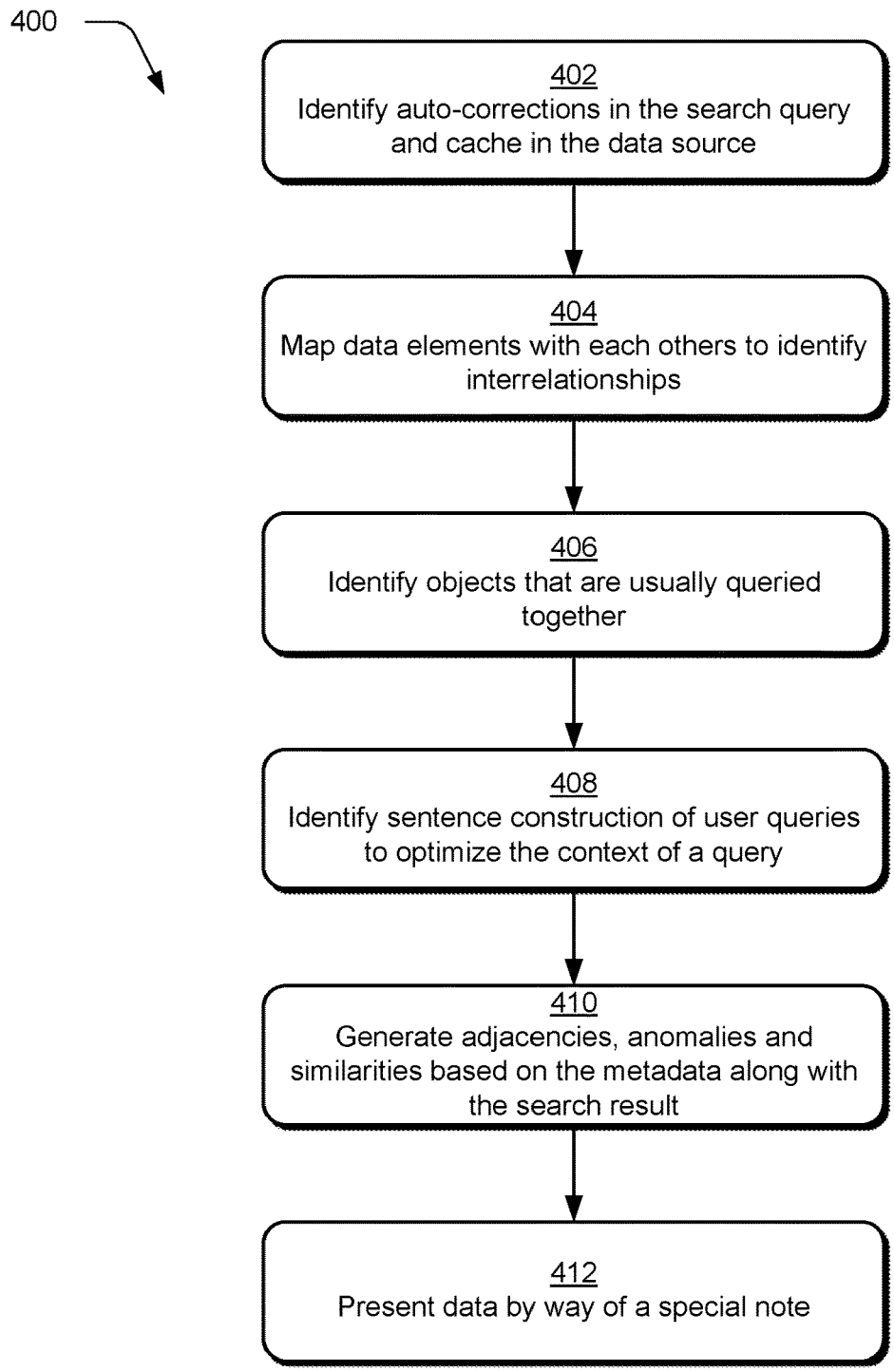
FIG. 4 is a flow diagram depicting an example procedure in accordance with one or more implementations.

FIG. 4 describes an example procedure 400 for curating metadata in a manner that expedites query processing. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in an environment by a suitably configured device, such as the example computing device 102 of FIG. 1 that makes use of a query processor 109, such as that described above.

At block 402, auto corrections in the search query are identified. Examples of how this can be done are provided above. Auto corrections can be identified based on abbreviations, commonly used in formal terms, and metadata-based corrections that are found by the crawlers when processing a data source. At block 404, data elements are mapped with each other to identify interrelationships between the data elements. Examples of how this can be done are provided above. Doing so can help limit the search results to an accurate set of search results. At block 406, objects that are usually queried together are identified. Identifying objects that are usually queried together can help to enrich the query results. This also helps in constructing type-ahead suggestions for the user's convenience. For example, if the user is searching "stores" by "sales" and "volume of products" much more than by "locations", or "square foot area"—suggestions would be relevant to the user's search patterns and the objects that are normally searched together At block 408, sentence construction of user queries is identified to optimize the context of a query. For example, as a user starts typing "stores", the type-ahead suggestions can be constructed as "stores in Minneapolis", or "stores in Austin" etc. because the attribute containing the store location is identified as a city, and the logical construction would be with the word "in <city>".

At block 410, adjacencies, anomalies, and similarities based on the metadata are generated, along with the search result of the particular query. Examples of how this case be done are provided above. At block 412, data is presented by way of a special note. Examples of how this case be done are provided above.

Figure 5:
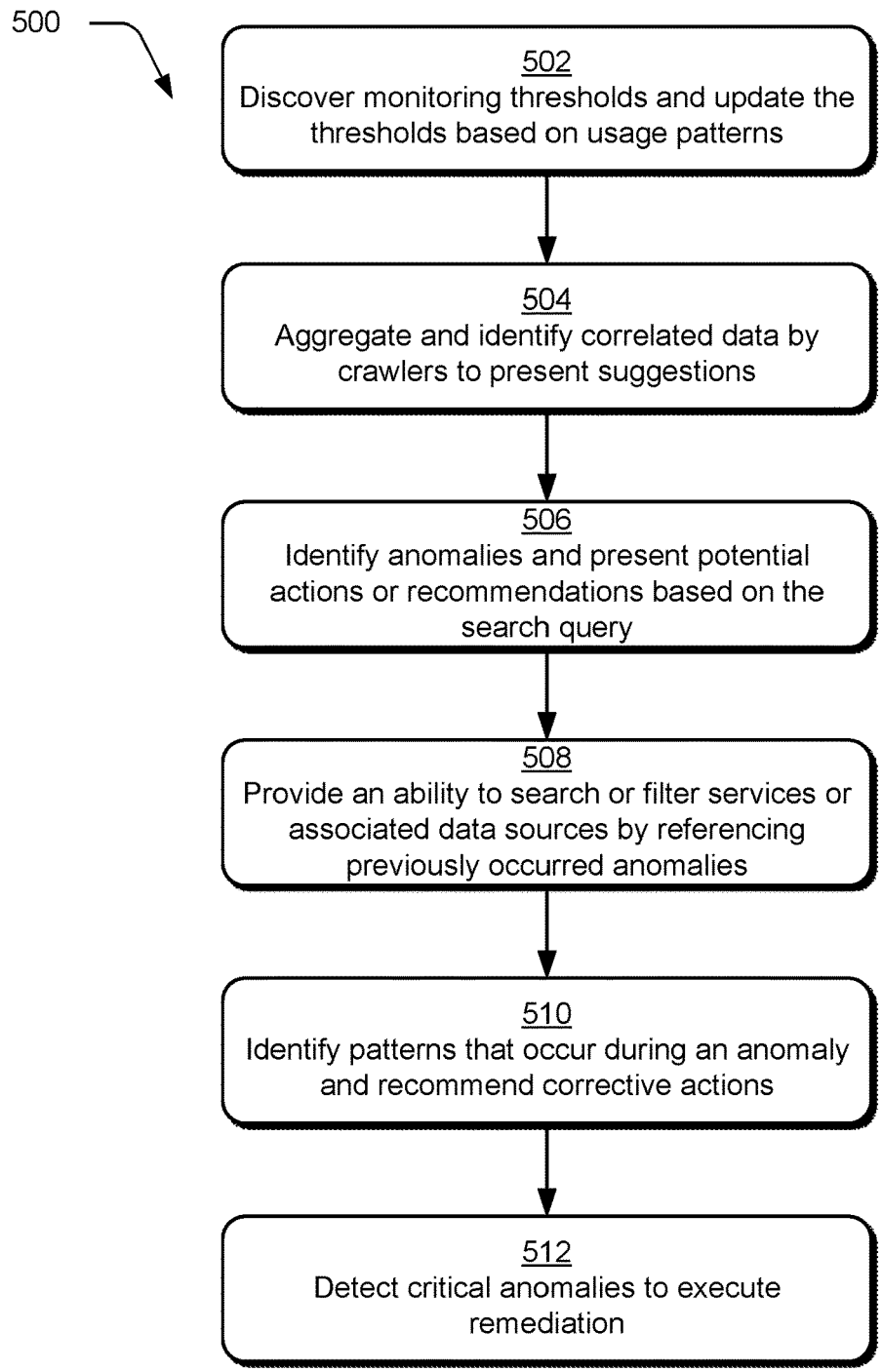
FIG. 5 is a flow diagram depicting an example procedure in accordance with one or more implementations.

FIG. 5 describes an example procedure 500 for compiling and presenting queried data. The method can monitor the query data to provide recommendations, identify anomalies, and support actionable remediations. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in an environment by a suitably configured device, such as the example computing device 102 of FIG. 1 that makes use of a query processor 109, such as that described above.

At block 502, monitoring thresholds are discovered and updated based on usage patterns. At block 504, correlated data is aggregated and identified by one or more crawlers to present suggestions. At block 506, anomalies are identified and potential actions or recommendations are presented based on the user's search query. At block 506, an ability to search or filter services or associated data sources is provided by referencing previously occurred anomalies. At block 510, patterns that occur during an anomaly are identified and corrective actions are recommended. At block 512, critical anomalies are detected in order to execute remediation.

As examples of how this method can be implemented, consider the following four examples.

Example 1

Consider a scenario in which data is scanned for two attributes "sales" and "date." When the numbers are scanned, it is discovered that the sales had a yearly increasing pattern between 2000-2014, but a monthly decreasing pattern between 2014-2016. When the user types a query phrase "sales" the system can show suggestions adjacent the search box as "sales negative growth after 2014", "sales growth change from 2012", "sales monthly growth from 2014", and the like. The learning from the data scope module can be used to recommend the type-ahead suggestions, or to show the "related queries" after a user search. Another use of the learning from the data scope is to show filters such as "positive growth between 2000-2014" or "negative growth after 2014", thus showing more descriptively rather than just showing the yearly numbers. This is applicable for the additional examples below.

Example 2

Consider the scenario when a scan is conducted for "sales", "city", and "country". Here, the system identifies the stores in a particular geography (e.g., Northeast America) having higher than average sales, and the other geographies with average sales. When the user types "sales" in the search box, the system can show suggestions as "sales in the Northeast", "sales in the rest of the US", "sales in the rest of the world", and the like.

Example 3

Consider a scenario in which a scan is conducted for "employee", "claim category", and "expense reimbursement amount" in a travel and expense reimbursement scenario. Here, the system identifies the average claim for hotel reimbursement was $120 per day, the highest as $920 per day, and the lowest as $35 per day. When the user types "Hotel claims", the system can show suggestions as "Hotel claims higher than the average $120", "Hotel claims between $35 to the average amount of $120", or "Hotel claims over $520."

Example 4

Consider a scenario where a scan is conducted for "airline", "ticket route", and "fare." Here, the system identifies the fair as the highest for a particular route among all airlines, and identifies the highest pairs for each airline. When the user types "expensive" the system can show suggestions as "expensive routes among all airlines", "expensive top 10 fairs in Delta Airlines", "expensive top five airline wise routes."

Having considered the embodiments described above, consider now aspects of an analytical search engine in accordance with one or more embodiments.

Analytical Search Engine

In one or more embodiments, functional aspects of the query processor 109 (FIG. 1) can be implemented to provide an analytical search engine. The analytical search engine provides a search-driven data analysis approach that greatly facilitates data searches. The analytical search engine provides a more efficient user experience and, at the same time, simplifies the search process for its users. The analytical search engine employs a robust search model that provides a comprehensive definition and coverage of available data. The search engine provides various functionality such as type-ahead or, more generally, look-ahead suggestions to help users define precise queries. The search engine also identifies ambiguous or incomplete queries and provides disambiguation suggestions to correct the queries.

The search engine also handles queries that have multiple meanings and mitigates cases where there could be more than one possible answer to the same user query or question. The user query or question may be input in any suitable way such as, by way of example and not limitation, through a keyboard, by touch input, verbal input, and so on. In at least some embodiments, the search engine also implements data governance policies to secure a user's access to data based on various parameters.

Figure 6:
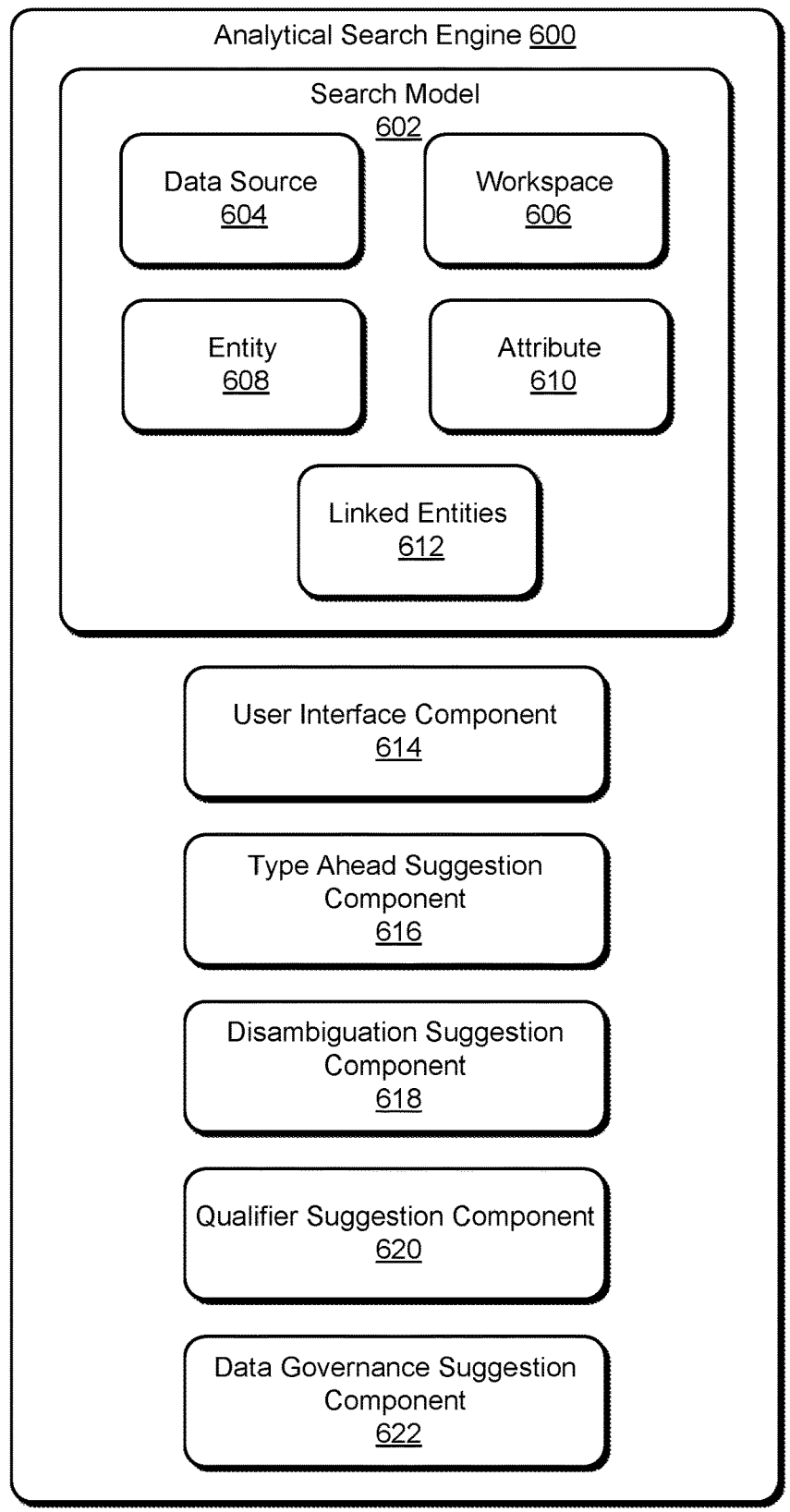
FIG. 6 illustrates an example analytical search engine including various components of an example device that can be employed for one or more search implementations described herein.

FIG. 6 illustrates an example analytical search engine 600 in accordance with one or more embodiments. The analytical search engine 600 includes a search model 602 which includes or otherwise makes use of one or more data sources 604, one or more workspaces 606, one or more entities 608, one or more attributes 610, and one or more linked entities 612. The analytical search engine 600 also includes a user interface component 614, a type-ahead suggestion component 616, a disambiguation suggestion component 618, a qualifier suggestion component 620, and a data governance suggestion component 622.

Search Model

Search model 602 is the fundamental basis for implementing search analysis. The search model 602 governs the way in which the search queries are processed to derive search results. Each query that the user enters, by way of a suitable search box provided by user interface component 614, is passed through the search model 602 to validate whether the query is complete and correct. The search model 602 helps to analyze each word entered in the query and relate each word to its respective data source to obtain the correct results.

Data source 604 is representative of the database for which the search model is created and which needs to be searched. Examples of data sources include Salesforce and Netsuite.

Workspace 606 refers to a collection of multiple data sources. For example, a Sales data space may have multiple data sources such as Salesforce and ServiceNow.

Entity 608 refers to a particular table in the database that contains the data being searched. An example of an entity is "Sales Representatives".

Attribute 610 refers to the columns in a table that contain the data being searched. So if the data being searched is sales representatives, examples of attributes might include full name, phone number, commission rate, and city of the sales representatives.

Linked entities 612 refers to the relationship or links between multiple entities across data sources or workspaces. For example, the "Sales Representative" entity can be linked to the "Product" entity to establish a relationship between the sales representatives and the products that they handle.

In the illustrated and described embodiment, a separate search model is created for each data source, as well as each workspace. All entities and attributes that are associated with the data source, and in scope of the search, are included. Under each entity, its related attributes are listed. Each attribute is defined based on different parameters such as data type (string, number, or text), variety (finite, infinite, or random), roles allowed, whether it is searchable or aggregatable. The possible synonyms of the attributes are also included. For example, an attribute called "Product" can have synonyms such as "Commodity", "Merchandise", "Good", or "Cargo." This ensures that the entire data in the data source is completely covered and mapped to provide comprehensive and correct results.

User Interface Component

User interface component 614 is representative of functionality that enables a user to interface with the analytical search engine 600. The user interface component does so by providing a search box in which the user may enter a natural language search query, as well as other visualizations such as those mentioned above, to enhance the user's experience.

In this manner, as in the above example, the analytical search engine 600 can provide for improved crawling and curation of data and metadata from diverse data sources. Improvements can be achieved by interpreting the context, vocabulary and relationships of data elements, to enable relational data search capability for users. The user querying process is improved by systematic identification of the aggregation methods and operators on the data elements as identified in the curation process. For example, if an attribute is identified as a MONEY type, a user's query such as "stores with sales over 2M" will be understood as "stores with sales over 2000000". Similarly, if an attribute is identified as "age" in a student entity, a query "teenager students" will be interpreted as "students with age between 13 to 19". User query suggestions and recommendations can be adjusted based on the context, relationships between the data elements, user profile, and the data sources. When the user query is executed, the query text is translated into an equivalent of one or more search statements, such as SQL statements or other statements, and the search is performed on the identified data sources. Results are assembled to present, by way of the user interface, a meaningful answer to the user query.

Type-Ahead Suggestion Component

Type-ahead suggestions guide the user with possible options while they enter search queries in a search box. Based on the words entered, the type-ahead suggestion component 616 predicts the next possible words which, when combined with the initial words, make a logical search query. For example, if the user enters "incidents", the type-ahead suggestion component 616 displays suggestions such as "by state", "by group", "by month", and the like. These suggestions help to convert vague queries into more precise and focused questions.

Further, the type-ahead suggestion component 616 learns from the custom terms entered by a particular user, and applies the learning across the particular user as well as other users. Accordingly, if the user has previously entered a term, the type-ahead suggestion component 616 learns and displays the term in the suggestions the next time the user enters a similar query. The type-ahead suggestion component 616 also displays popular search phrases entered previously to ease the search process for the user. In at least some embodiments, particularly those that are tailored for individual users, the analytical search engine 600 can maintain or otherwise have access to user profiles for the individual users. Inside each user profile, a list of custom terms entered by the particular user can be maintained and utilized to present type-ahead suggestions.

In at least some embodiments, the type-ahead suggestion component 616 uses a weighted data model that connects each attribute with adjacent attributes which, in turn, can connect with other adjacent attributes. Each relationship has a weight based on the attributes that are connected, and the methods that are applied on these attributes. The weights vary by the usage and knowledge gleaned from observing the user's behavior. For example, consider the attribute "country" which can be connected to "gross sales" and "profits". The relationship "country&profits" could have a heavier weight than the weight for "country&gross sales". Within the relationship of "country&profits"—a phrase like "top country with most profits" could have a heavier weight than "list of country by profits".

As another example, consider the following. Assume that the database of interest has three items of information in it—states, profits, and stores. If a particular user constantly searches for stores and profits, then states will have a lower weight than stores and profits for this particular user. So the weights that are applied are influenced by how frequently the corresponding particular term is being searched by that user. In addition, the frequency of use by the particular user influences the weight applied to a term for that particular user, and weights based on all users in the system. That is, an individual user's frequency of searching has both a local and a global effect on applied weights. For example, consider the term "California". Assume in this search example that California appears in two different tables—one pertaining to store locations and another pertaining to customer locations. Assume the user has entered the query that asks for "sales in California". This query can be interpreted in two different ways—sales of stores in California or sales of customers in California. In this instance, the type-ahead suggestion component attempts to identify the more relevant query for the user. That is, the system attempts to ascertain which search query is contextually more important to the particular user. So, in this instance, the system would attempt to ascertain whether store sales are more important to the user or customer sales are more important to the user. To do so, the system would look to the weights applied to each of the suggestions for that particular user. So, if the user is a person who works in sales, based on that user's own search history, stores may be weighted more heavily than customers. As such, the type-ahead suggestion component will suggest "sales of stores in California" ahead of "sales of customers in California". If, on the other hand, the user is a person from the marketing team and typically searches more often for customer related data, the type-ahead suggestion component might suggest "sales of customers in California" ahead of "sales of stores in California".

In one or more embodiments, the type-ahead suggestion component 616 can disambiguate entered search terms based on geography. That is, when a user enters a geographical-based attribute, such as "city" in the search box, the type-ahead suggestion component can present suggestions to attempt to provide a more precise and focused search query. For example, if a user searches for "top 5 cities with most overdue loans", the type-ahead suggestion component might show "in Canada", "in the United States", and "in Mexico". This is because of the context and possible relationship between "city" and "country". As in the above example, the suggestions can be provided based on weights that are applied to the suggestions as a function of the frequency that a particular user searched these terms. Alternately or additionally, in the event the user is unknown to the system such that the user's search frequency cannot be ascertained, possible suggestions can be provided by the system based on the global frequency of use of other users.

In one or more embodiments, when the user enters a query in the search box that does not have any time constraint or a time aggregate specified, the type-ahead suggestion component can include one or more relevant and contextually-related time scope suggestions. For example, if the user searches for "new customer acquisitions", the type-ahead suggestion component might suggest "new customer acquisitions this week", "new customer acquisitions this month", or "new customer acquisitions this quarter". Again, this can be based on the particular user's previously-documented search terms in the context of searching for acquisitions. Alternately or additionally, this can be based on previously-documented search terms for global users in the event information on the particular user is not available.

In one or more embodiments, the type-ahead suggestion component can show suggestions that attempt to limit the number of search results in the event that a user's search has a very broad scope. For example, a doctor may search for "endocrine surgery patients with prior symptoms of memory loss". To attempt to limit the number of search results to a reasonable amount, the type-ahead suggestion component may add suggestions of "this year", or "in California" to limit the number of results. Otherwise, the massive set of results that might be generated by the user's search would have the potential to slow down the query response times and provide potentially irrelevant search results for the user. Again, the suggestions provided can be based on the context for the particular user based on past history and frequency parameters as described above.

In one or more embodiments, the analytical search engine 600 identifies the context in which a user's query words are used in order to display further search suggestions to refine the user's search. The likely context of the user is predicted based on a combination of the user's search history, context of the keywords used in the current search query, environment configuration, geolocation, and the user preferences. For example, when a user enters "new customers", the analytical search engine understands from the user's search history and other factors mentioned above, that the context is either about time or geography. The type-ahead suggestion component can then present suggestions such as "this week", "this season", "in Texas", and "for new products".

Figure 7:
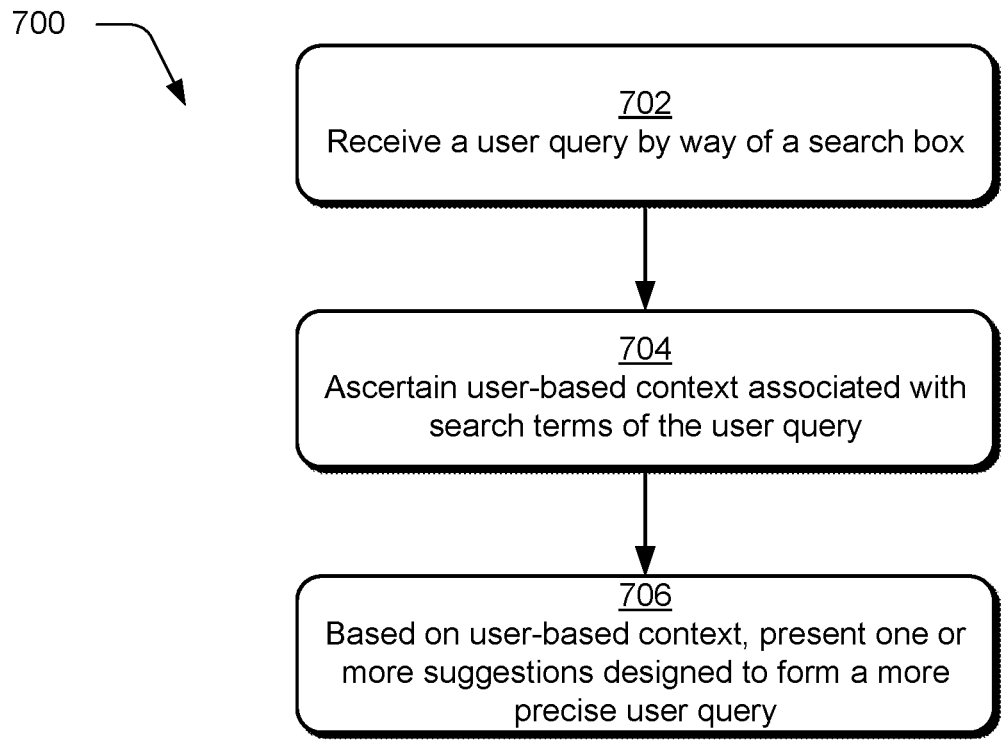
FIG. 7 is a flow diagram that describes steps in a method in accordance with one embodiment.

FIG. 7 describes an example procedure 700 for providing search suggestions, such as look-ahead or type-ahead suggestions, in a manner that provides more precise and focused queries. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in an environment by a suitably configured device, such as the example computing device 102 of FIG. 1 that makes use of an analytical search engine 600, such as that described above.

A user query is received by way of a search box (block 702). The user query can be received in any suitable way including, by way of example and not limitation, through keyboard input, touch input, audible input (such as a spoken query), and the like. A user-based context associated with search terms of the user query is ascertained at block 704. The user-based context can be ascertained based on any suitable parameters including, by way of example and not limitation, the user's search history, the context of keywords in the current search query, the environment configuration, geolocation, or the user preferences. This step can be performed, at least in part, utilizing a weighted data model in which assigned weights are utilized to ascertain possible suggestions that are to be presented to the user. For example, a user may enter a search term that has previously been linked to other attributes based on the user's search history. The links with other attributes define relationships, each of which has a weight based on the user's search history. Thus, in the user's particular context, relationships associated with terms that are more frequently searched by the user are weighted more heavily than those relationships that are less frequently searched by the user. Based on the user-based context, one or more suggestions designed to form a more precise user query are presented at block 706.

Having considered type-ahead suggestions in accordance with one or more embodiments, consider now the disambiguation suggestion component.

Disambiguation Suggestion Component

In the process of entering a search query into analytical search engine 600, a user may enter a query that is ambiguous or may have multiple connotations. In this instance, the search engine 600, by way of disambiguation suggestion component 618, identifies such instances and provides disambiguation recommendations that help refine the user's query to provide focused search results. In the illustrated and described embodiment, the disambiguation process implemented by disambiguation suggestion component 618 employs a two-step process. First, an ambiguous search query is first identified. Identification of the ambiguous search query is employed in a manner that is the same across all users. That is, the process used to identify ambiguous search queries is the same regardless of the user entering the query. Once the ambiguous search query is identified, possible suggestions to disambiguate the ambiguous search query are identified. So, for example, an ambiguous search query may lead to ten possible suggestions to disambiguate the ambiguous search query. Second, once an ambiguous search query has been identified, and the possible disambiguation suggestions have been identified, selection logic employed by the disambiguation suggestion component 618 will attempt to select the most appropriate suggestion for the specific user based upon one or more parameters including, by way of example and not limitation, the user's search history, the context of keywords used in the current search query, environment configuration, geolocation of the user, or user preferences. So, for example, for one user the top disambiguation suggestion may be different from the top disambiguation suggestion for another user. This is due, largely in part, to the differences between the user context. That is, one user may have a search history that is more heavily predisposed to a first disambiguation suggestion, while the other user may have a search history that is more heavily predisposed to a second different disambiguation suggestion. In this manner, the disambiguation suggestion process has what can be considered a global standardized aspect, and a local, user centric aspect.

As an example, consider the following. A word may have multiple meanings or may refer to different entities. The analytical search engine 600, by way of disambiguation suggestion component 618, identifies the context in which such a word is used in the search query by the user and displays the search results for the most relevant one. The system automatically picks the best possible choice and re-phrases the user query. Other possible choices can be shown to the user. Thus, for a given user, the system picks the most possible and relevant answer for the context of a given query based on search history, user preferences, user profile, geolocation, and other parameters such as those mentioned above. For example, a user may search for "stores in Washington". "Washington" could match with both "Washington D.C." or "Seattle, Wash.". If the user's search history indicates more frequent searches associated with Washington D.C., the disambiguation suggestion component 618 will selects "stores in Washington D.C." and display it in the search box with other possible suggestions displayed therebeneath.

In some instances, the user query may be incomplete such that an appropriate answer or search result cannot be found. Alternately, the user query may be incomplete enough to lead to seemingly ambiguous or irrelevant search results. In these instances, the disambiguation suggestion component 618 refines and completes such queries by providing relevant context. In such cases, the search engine rephrases or completes the user query with the best matching suggestion and displays the results. For example, the user in an auto dealership may search for "customer complaints last month". This query is actually incomplete because the user did not specifying whether the search is for the customer complaints that were created last month, or the customer complaints that were resolved last month. In this case, once the incompleteness or ambiguity has been identified by the disambiguation suggestion component 618 and possible suggestions have been identified, the disambiguation suggestion component can rephrase the query to "customer complaints resolved last month". This is because, for the particular user executing a query, the user may frequently search for complaint resolution statistics rather than complaint creation statistics. The other suggestions may be displayed below the search box such that the user can select those suggestions if appropriate. Specifically, in this instance, the suggestions displayed below the suggestion in the search box may include "customer complaints created last month", and "customer complaints escalated last month".

In some instances, a user query may not specify how to present the results and the query terms are unrelated to each other. In such cases, additional selection criteria can be used to provide results. For example, a user query may specify "cities in Germany this year". This query does not specify which cities are to be shown. In such cases, the disambiguation suggestion component 618 may correct the query to "list of cities in Germany this year", or "unique cities in Germany this year". So, for example, assume the user enters a query "list of cities in Germany". Say there is a city name "XYZ" that is the same for two or three cities in Germany in different states. The question becomes whether the user is looking for a list of cities as a single name or whether the user is looking for a list of cities along with the states in which they reside. If a simple list of cities were displayed for the user with no additional information, the user may question why there are three repeat entries for the same city name That is, the search results would appear to be ambiguous, in a sense, to the user. In this situation, the disambiguation suggestion component 618 disambiguates the search results by adding additional information to the search results. For example, in this instance, instead of providing a single column with search results listing all the cities including the three repeat entries, the disambiguation search component 618 adds additional information, in the form of a second column, that lists "state name" associated with each identified city. In this case, the additional information provided by disambiguation suggestion component 618 was not requested by the user. However, because the additional information was provided in view of the perceived ambiguity, the user receives search results that are unambiguous.

In some instances, a user may actually ask for an entire object rather than asking for attributes of the object. In such cases an important set of attributes can be selected by the disambiguation suggestion component 618 to display the results. These important set of attributes can be selected by a combination of frequently used, context of the current search query, environment configuration, geolocation, and user preferences. For example, a user may enter a query "salesman hired this year". This query could be interpreted as meaning "full name, joining date, business unit, job grade". These items are all attributes of the salesman object and may be originating from related or linked objects. So, in this instance, the problem can be considered as a two-part problem. First, the disambiguation suggestion component 618 identifies that the search query is ambiguous to a certain degree. The query has asked for the entire object but not specified any attributes of the object. Once relevant attributes of the object are identified, such as through linkages, selection logic now becomes user based. Specifically, from the universe of selectable attributes associated the requested object, attributes can be selected that are user driven based on, for example, attributes that are frequently used by the user, user preferences, geolocation, and the like.

In some instances, a user phrase in a query can be automatically expanded to select more than one attribute across one or more entities per the common use or verbatim. For example, "salesman" could be interpreted as "salesrep" or "gender as male".

Figure 8:
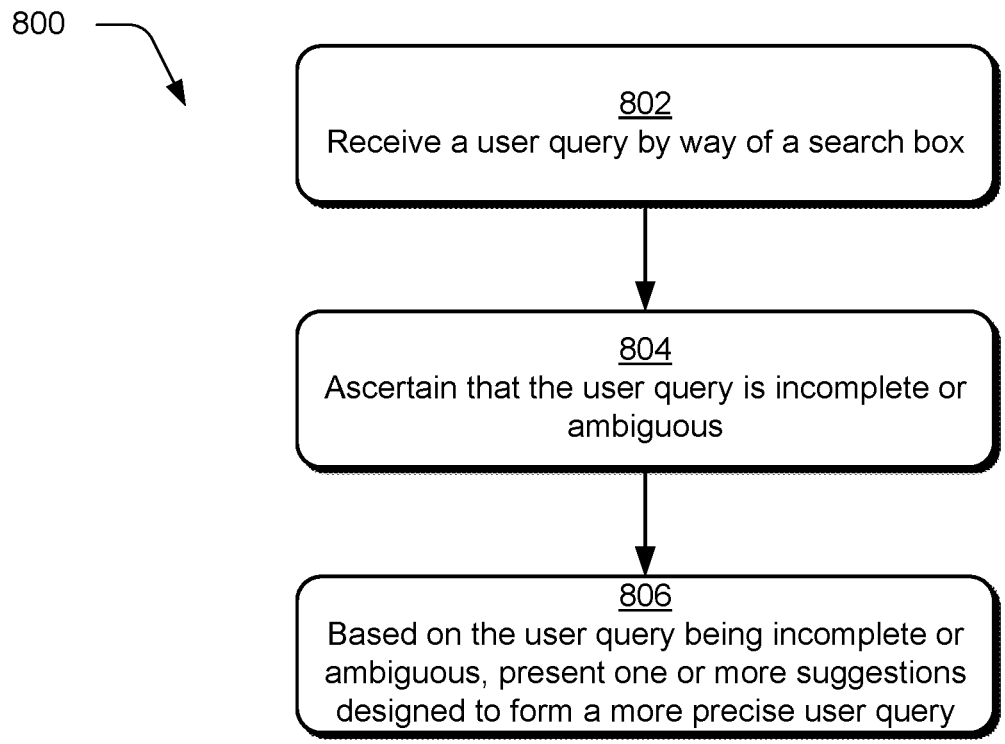
FIG. 8 is a flow diagram that describes steps in a method in accordance with one embodiment.

FIG. 8 describes an example procedure 800 for providing disambiguation suggestions in a manner that provides more precise and focused queries. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in an environment by a suitably configured device, such as the example computing device 102 of FIG. 1 that makes use of an analytical search engine 600, such as that described above.

A user query is received by way of a search box (block 802). The user query can be received in any suitable way including, by way of example and not limitation, through keyboard input, touch input, audible input (such as a spoken query), and the like. The user query is ascertained to be incomplete or ambiguous at block 804. A search query or user query can be incomplete or ambiguous for different reasons. For example, a word in the user query may have multiple meanings or may refer to different entities. Alternately or additionally, a user query may be incomplete or ambiguous because it would lead to ambiguous, irrelevant, or nonexistent results. Incompleteness and ambiguities may also arise because the user may not have specified how to present search results or the query terms are unrelated to one another. Furthermore, incompleteness or ambiguities may arise because a user may have asked for an entire object, rather than attributes of the object. Based on the user query being incomplete or ambiguous one or more suggestions designed to form a more precise user query are presented at block 806. This step can be performed in any suitable way. In at least some embodiments, this step is performed by first identifying, based on the ambiguity or incompleteness, multiple suggestions that might be used to disambiguate the search query. Next, based on the particular user or user context, a top suggestion can be selected and presented to the user, with other suggestions following therebeneath. The particular user or user context that is considered in formulating a top selection can include considering the user's search history, user preferences, user profile, geolocation, as well as other parameters mentioned above.

Having considered an example disambiguation suggestion component in accordance with one or more embodiments, consider now an example qualifier suggestion component in accordance with one or more embodiments.

Qualifier Suggestion Component

When qualifiers or adjectives, such as "best", "top", "popular", "least" are used in search queries, it may be unclear as to the attribute to which the term applies. For example, a user may be a sales manager and enters a search query for "top salesperson in Germany this month". In this example, the user did not specify the parameter that defines what "top" means in sales, profits, or units sold. In this example, the qualifier suggestion component 620 identifies the ambiguity and, based on the user query being ambiguous, presents one or more suggestions designed to form a more precise user query. This is done by considering user specific parameters such as the user's search history, user preferences, user profile, geolocation, as well as other parameters mentioned above. So, in this particular example, based on the user specific parameters, the qualifier suggestion component 620 may display "top salesperson in Germany this month by gross sales". The other possible suggestions can be displayed beneath the top suggestion which is displayed in the search box. So, in this example, the user's search history may indicate that the user has conducted many previous searches in and around gross sales. As such, the relationship between "top" and "gross sales" may be weighted more heavily than the other relationships so as to cause it to be selected as the top suggestion.

Having considered qualifier suggestions in accordance with one or more embodiments, consider now data governance suggestions in accordance with one or more embodiments.

Data Governance Suggestion Component

In accordance with one or more embodiments, the analytical search engine 600 can apply, through data governance suggestion component 622, data governance policies for every query entered by a user. The data governance policies can pertain to whether or not the user can access certain data. The data governance suggestion component 622 provides built-in security policies at various levels including the user level, the user's role, the user's group, the user's organization, or any other aspect to which the user belongs. The data governance suggestion component 622, based upon the data governance policies, can control whether functionality such as the type ahead suggestion functionality, the disambiguation suggestion functionality, and the qualifier suggestion functionality is made available to a particular user. Data governance can also be applied at the level of the workspace, data source, entity, attribute, link entities, rows of data, or even a specific data element itself. For example, when a sales manager from North America asks for "sales this quarter in the city of", the data governance suggestion component 622 can cause the system to display the names of cities in North America only in the search suggestions. If the city is located in Europe, the city may not appear in the suggestions as the data governance policy may be set to display only the results belonging to the selected geography for the user.

In some instances, the analytical search engine 600 may try to clarify to the user if what the user is asking is understood, but not in the data itself. This is done by maintaining a known list of terms for the given customer, enterprise, or the industry based on the knowledge that is captured from other users. For example, a doctor may ask the question such as "non-smoking patients with lung cancer" and the system does not have any information about cancer patients. The search engine 600, in this instance, would respond saying that it understood the question, but the data does not contain any information concerning cancer or lung cancer. In this manner, the system avoids answering with an empty response or a null condition, and instead provides some context to inform the user that it does not have any data pertaining to the query the user has asked.

Having considered the various embodiments described above, consider now an example system and device that can implement the embodiments. It is to be appreciated and understood, however, that the inventive principles can be implemented in other ways, without departing from the spirit and scope of the claimed subject matter.

Example System and Device

Figure 9:
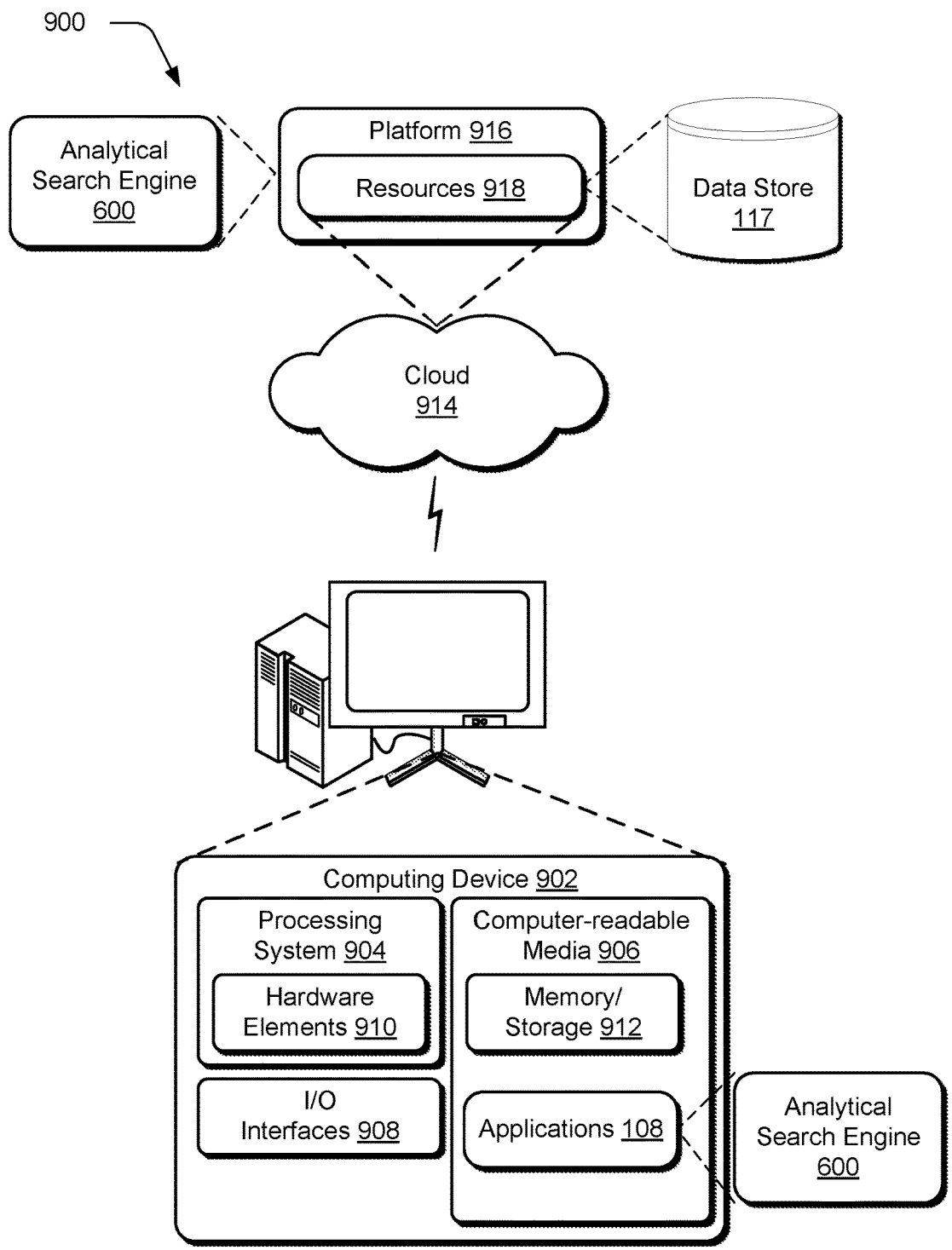
FIG. 9 illustrates an example system including various components of an example device that can be employed for one or more search implementations described herein.

FIG. 9 illustrates an example system generally at 900 that includes an example computing device 902 that is representative of one or more computing systems and/or devices that may implement the various techniques described herein. This is illustrated through inclusion of the applications 108 and, in particular, analytical search engine 600, which operates as described above. The computing device 902 may be, for example, a server of a service provider, a device associated with a client (e.g., a client device), an on-chip system, and/or any other suitable computing device or computing system.

The example computing device 902 is illustrated as including a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, holographic devices and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Such applications can include one or more aspects of analytical search engine 600 as described above. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device implementation, implementation of functionality described herein may be distributed throughout the system 900. For example, the functionality may be implemented in part on the computing device 902 as well as via the platform 916 that abstracts the functionality of the cloud 914.

CONCLUSION

Improved crawling and curation of data and metadata from diverse data sources is described. In some embodiments, improvements are achieved by interpreting the context, vocabulary and relationships of data element, to enable relational data search capability for users. The user querying process is improved by systematic identification of the data objects, context, and relationships across data objects and elements, aggregation methods and operators on the data objects and data elements as identified in the curation process. User query suggestions and recommendations can be adjusted based on the context, relationships between the data elements, user profile, and the data sources. When the user query is executed, the query text is translated into an equivalent of one or more query statements, such as SQL or PostGre statements, and the query is performed on the identified data sources. Results are assembled to present the answer in a meaningful visualization for the user query.

In one or more embodiments, an analytical search engine is provided. The analytical search engine provides a search-driven data analysis approach that greatly facilitates data searches. The analytical search engine provides a more efficient user experience and, at the same time, simplifies the search process for its users. The analytical search engine employs a robust search model that provides a comprehensive definition and coverage of available data. The search engine provides various functionality such as type-ahead or look-ahead suggestions to help users define precise queries. The search engine also identifies ambiguous or incomplete queries and provides disambiguation suggestions to correct the queries.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
receiving, by a computer, one or more words of a search query from a user;
determining that the one or more words specify, without identifying an attribute associated with at least one of an object or a qualifier, the at least one of the object or the qualifier;
identifying one or more attributes associated with the at least of the object or the qualifier specified by the one or more words of the search query, based on at least one of a search history of the user, a context of the search query, an environment configuration, a geolocation of the user, a profile of the user, or one or more preferences of the user;
generating one or more suggested additions to the search query based on the one or more attributes; and
causing display of the one or more suggested additions to the search query on a display device.

2. The method as described in claim 1, wherein said generating one or more suggested additions to the search query comprises utilizing a weighted data model in which weights are assigned to relationships between attributes.

3. The method as described in claim 1, further comprising:
selecting a top suggested addition from amongst the one or more suggested additions; and
presenting the top suggested addition to the user.

4. The method as described in claim 1, further comprising generating the one or more suggested additions in response to determining that the search query would lead to ambiguous results.

5. The method as described in claim 1, further comprising generating the one or more suggested additions in response to determining that the search query omits specification of a form for presentation of search results.

6. The method as described in claim 1, further comprising applying one or more data governance policies that pertain to whether or not the user can access certain data.

7. The method as described in claim 1, further comprising:
analyzing metadata associated with a first data source; and
structuring the metadata to facilitate search queries,
wherein a portion of the context of the search query is based on the metadata.

8. The method as described in claim 1, further comprising:
analyzing metadata associated with a first data source; and
building a first context element associated with the metadata to facilitate search queries,
wherein a portion of the context of the search query is based on the first context element.

9. The method as described in claim 1, further comprising:
analyzing metadata associated with a first data source;
identifying a relationship of a first data element included in the first data source to a second data element included in the first data source based on the metadata; and
generating a mapping of the first data element to the second data element based on the relationship,
wherein a portion of the context of the search query is based on the mapping.

10. One or more computer-readable storage media storing instructions which, when executed by one or more processors, cause the one or more processors to perform operations comprising:

receiving one or more words of a search query from a user;

determining that the one or more words specify, without identifying an attribute associated with at least one of an object or a qualifier, the at least one of the object or the qualifier;

identifying one or more attributes associated with the at least of the object or the qualifier specified by the one or more words of the search query, based on at least one of a search history of the user, a context of the search query, an environment configuration, a geolocation of the user, a profile of the user, or one or more preferences of the user;

generating one or more suggested additions to the search query based on the one or more attributes; and causing display of the one or more suggested additions to the search query on a display device.

11. The one or more computer-readable storage media as described in claim 10, the operations further comprising applying one or more data governance policies that pertain to whether or not the user can access certain data.

12. The one or more computer-readable media as described in claim 10, wherein said generating one or more suggested additions to the search query comprises utilizing a weighted data model in which weights are assigned to relationships between attributes.

13. The one or more computer-readable media as described in claim 10, wherein the operations further comprise:

selecting a top suggested addition from amongst the one or more suggested additions; and presenting the top suggested addition to the user.

14. The one or more computer-readable media as described in claim 13, wherein said determining that the search query is ambiguous comprises ascertaining that the search query omits specification of a form for presentation of search results.

15. The one or more computer-readable media as described in claim 10, wherein the operations further comprise generating the one or more suggested additions in response to determining that the search query would lead to ambiguous results.

16. The one or more computer-readable storage media as described in claim 10, wherein the operations further comprise:

analyzing metadata associated with a first data source; and structuring the metadata to facilitate search queries, wherein a portion of the context of the search query is based on the metadata.

17. The one or more computer-readable storage media as described in claim 10, wherein the operations further comprise:

analyzing metadata associated with a first data source; and building a first context element associated with the metadata to facilitate search queries, wherein a portion of the context of the search query is based on the first context element.

18. The one or more computer-readable storage media as described in claim 10, wherein the operations further comprise:

analyzing metadata associated with a first data source;

identifying a relationship of a first data element included in the first data source to a second data element included in the first data source based on the metadata; and generating a mapping of the first data element to the second data element based on the relationship, wherein a portion of the context of the search query is based on the mapping.

19. A system comprising:

a memory including instructions; and a processor that is coupled to the memory and, when executing the instructions, is configured to perform the steps of:

receiving one or more words of a search query from a user;

determining that the one or more words specify, without identifying an attribute associated with at least one of an object or a qualifier, the at least one of the object or the qualifier, identifying one or more attributes associated with the at least of the object or the qualifier specified by the one or more words of the search query, based on at least one of a search history of the user, a context of the search query, an environment configuration, a geolocation of the user, a profile of the user, or one or more preferences of the user, generating one or more suggested additions to the search query based on the one or more attributes; and causing display of the one or more suggested additions to the search query on a display device.

20. The system as described in claim 19, wherein said generating one or more suggested additions to the search query comprises utilizing a weighted data model in which weights are assigned to relationships between attributes.

21. The system as described in claim 19, wherein the processor, when executing the instructions, is further configured to perform the steps of:

selecting a top suggested addition from amongst the one or more suggested additions; and presenting the top suggested addition to the user.

22. The system as described in claim 19, wherein the processor, when executing the instructions, is further configured to perform the step of generating the one or more suggested additions in response to determining that the search query would lead to ambiguous results.

23. The system as described in claim 19, wherein the processor, when executing the instructions, is further configured to perform the step of generating the one or more suggested additions in response to determining that the search query omits specification of a form for presentation of search results.

24. The system as described in claim 19, further comprising applying one or more data governance policies that pertain to whether or not the user can access certain data.

25. The system as described in claim 19, wherein the processor, when executing the instructions, is further configured to perform the steps of:

analyzing metadata associated with a first data source; and structuring the metadata to facilitate search queries, wherein a portion of the context of the search query is based on the metadata.

26. The system as described in claim 19, wherein the processor, when executing the instructions, is further configured to perform the steps of:

analyzing metadata associated with a first data source; and building a first context element associated with the metadata to facilitate search queries, wherein a portion of the context of the search query is based on the first context element.

27. The system as described in claim 19, wherein the processor, when executing the instructions, is further configured to perform the steps of:

analyzing metadata associated with a first data source;

identifying a relationship of a first data element included in the first data source to a second data element included in the first data source based on the metadata; and generating a mapping of the first data element to the second data element based on the relationship, wherein a portion of the context of the search query is based on the mapping.

* * * * *